United States Patent [19]

Renshaw

[11] 4,333,014

[45] Jun. 1, 1982

[54] CROSSTABLE X-RAY CASSETTE HOLDER

[76] Inventor: Governor K. Renshaw, 14448 Merced St., San Leandro, Calif. 94579

[21] Appl. No.: 166,609

[22] Filed: Jul. 7, 1980

[51] Int. Cl.³ .................. G01N 21/01; G11B 1/00; G12B 9/00

[52] U.S. Cl. .................................. 250/521; 250/444; 250/468

[58] Field of Search ............... 250/521, 444, 468

[56] References Cited

U.S. PATENT DOCUMENTS 2,651,725  9/1953  McFarland ............... 250/521

3,072,788  1/1963  Oller ............... 250/468

FOREIGN PATENT DOCUMENTS 1551182  11/1967  France ............... 250/468

Primary Examiner—Alfred E. Smith
Assistant Examiner—T. N. Grigsby
Attorney, Agent, or Firm—Alvin E. Hendricson

[57] ABSTRACT

An X-ray film cassette holder has adjustable end retaining means pivotally mounted on an end of a pivotally adjustable link that is adapted for mounting in a track along one side of an X-ray table for positioning X-ray film for different varieties of cross table radiography.

6 Claims, 5 Drawing Figures

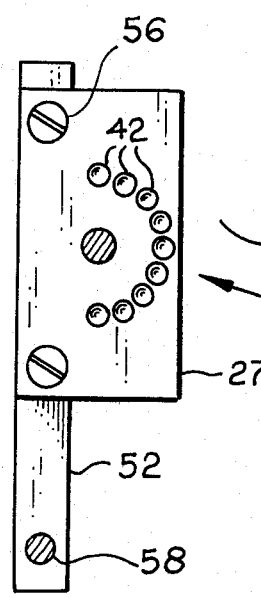
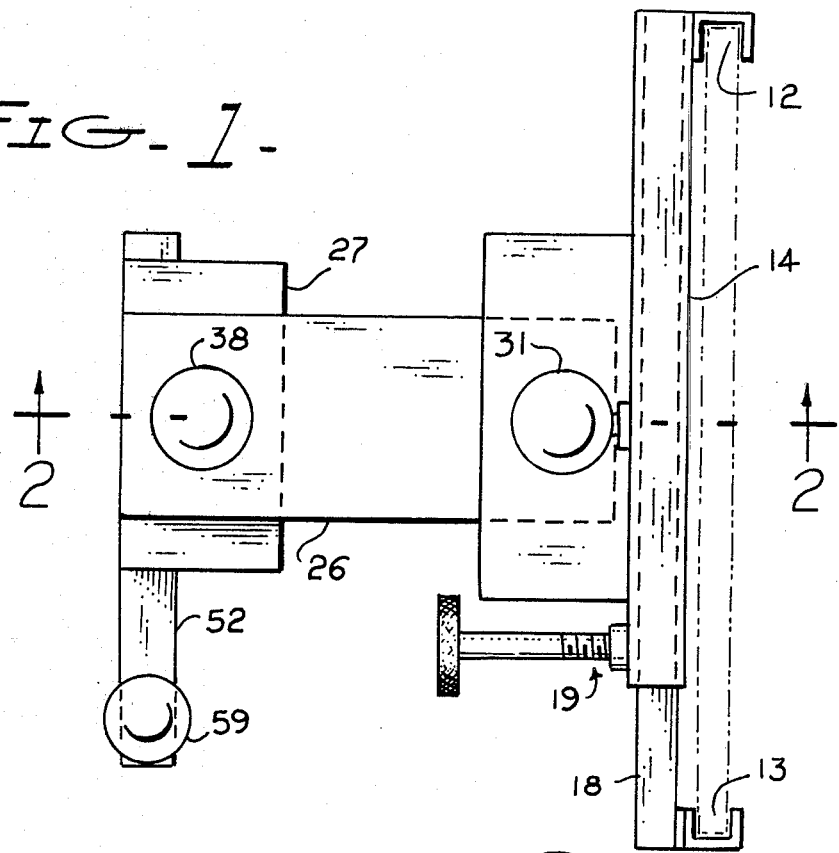
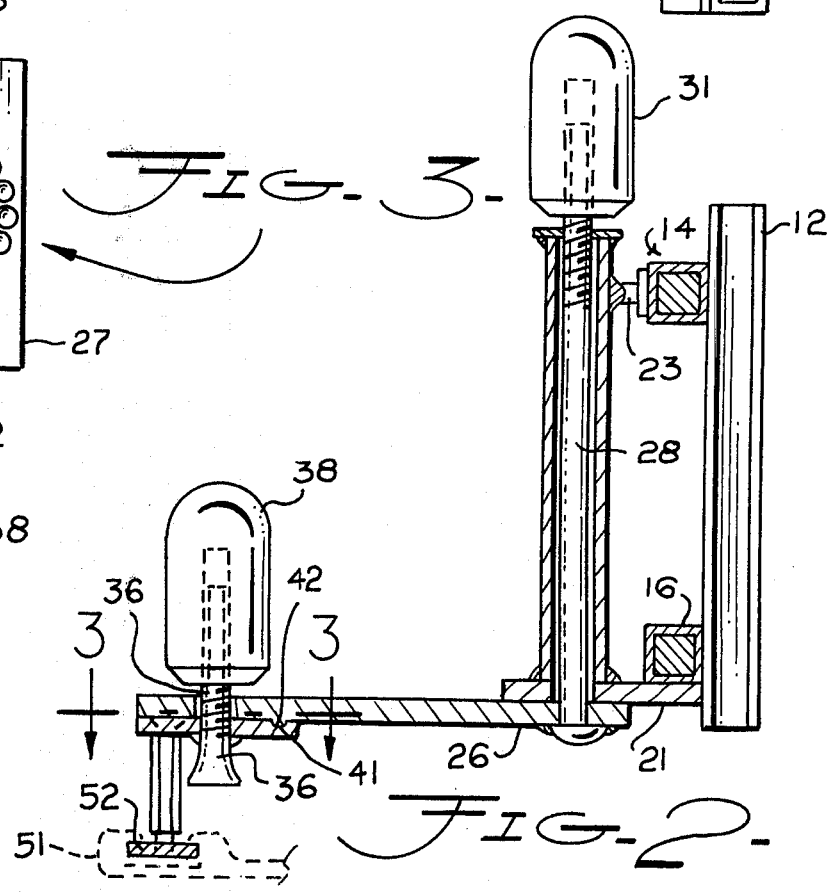

CROSSTABLE X-RAY CASSETTE HOLDER

SUMMARY OF INVENTION

The film cassette holder or mount of the present invention has a pair of facing U-shaped end retainers mounted on slide bars of adjustable length with locking means for setting the retainer spacing to accept film of different dimensions. The slide bars are fixed in spaced relation upon a vertical cylinder about a mounting post with a lock or tightening means for setting the angular position of the plane of the retainers.

A horizontal pivot link or arm carrying the mounting post is in turn pivotally carried by a mounting plate having a pivot pin shaft extending vertically upward therefrom with means for tightening the link and mounting plate together. A small boss faces an arc of indentations between the link and mounting plate for firmly locking them in any adjusted angular relation.

The holder of the present invention is adapted to be mounted at a top side of an X-ray table and to hold or restrain a cassette of X-ray film that rests upon the table top. This mounting may be accomplished by an elongated inverted T-shaped foot depending from the mounting plate and slidably engage a reentrant slot in a track along one side of the table top. Locking means are provided for fixing the longitudinally adjusted position of the foot in the track and also adjustable levelling means provide for precise alignment of the holder.

The holder may be moved laterally and longitudinally of the table and may be pivoted about a vertical axis to accommodate a wide variety of different crosstable radiographs. Tilting of the table up to 90° does not displace the film retained by the present invention.

BACKGROUND OF INVENTION

Various types of X-ray film and cassette holders have been developed so that technicians or the like need not hold the film during exposure to X-rays. Examples of adjustable plate and cassette holders are to be found in U.S. Pat. Nos. 2,919,625, 2,919,873, 3,072,788, 3,634,685, 3,694,653, 3,771,781, and prior art cited therein. Some prior devices provide for positioning the patient and the film; however, none provide a completely satisfactory cross table holder capable of multiple adjustments for maximum flexibility.

DESCRIPTION OF FIGURES

The present invention is illustrated as to a single preferred embodiment in the accompanying drawings, wherein:

FIG. 1 is a top plan view of a holder in accordance with the present invention;

FIG. 2 is a central vertical sectional view taken in the plane 2—2 of FIG. 1;

FIG. 3 is a partial sectional view taken in the plane 3—3 of FIG. 2;

DESCRIPTION OF PREFERRED EMBODIMENT

Figure 4:
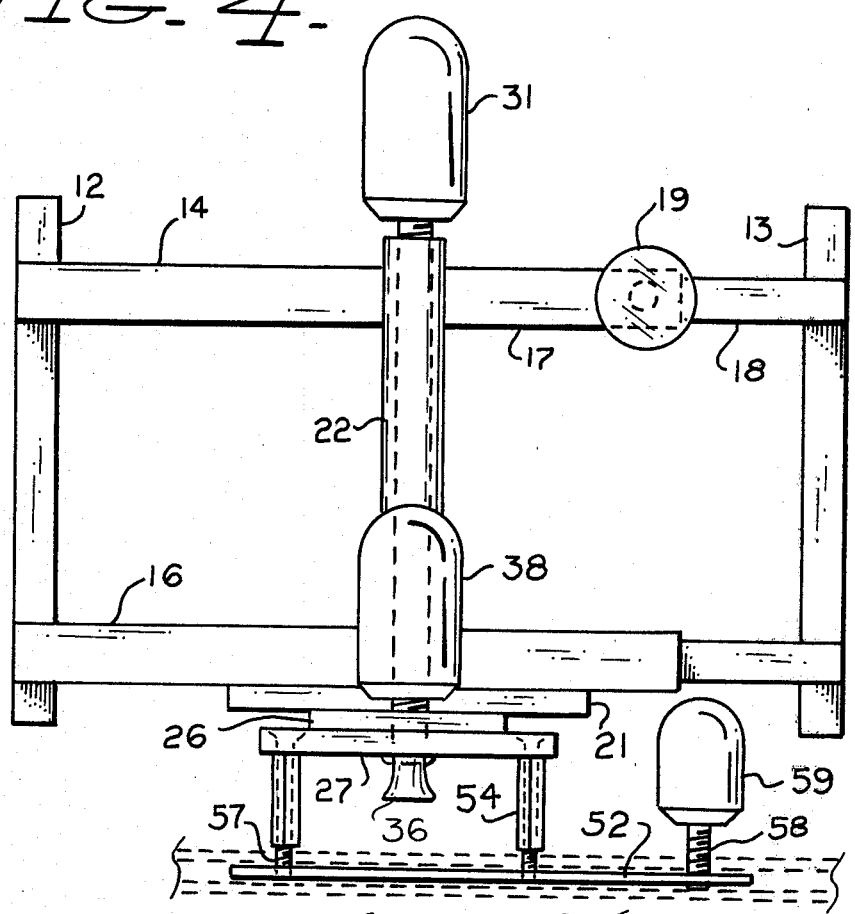
FIG. 4 is a rear elevational view of the holder of FIG. 1.

Referring to the drawings, there will be seen to be illustrated a preferred embodiment of the present invention including a pair of end retainers or clamping means 12 and 13 having the form of a facing vertical U-shape channels. These retainers are carried by upper and lower support or slide bars 14 and 16 respectively. The support bars may be the same and each are provided as a hollow rectangular tube 17 having a mating rod 18 slidably disposed therein and extending from one open end thereof. Locking means 19 are provided as a bolt having an enlarged head for hand gripping and threaded through the tube 17 for tightening against the rod 18 so as to fix the longitudinal extent of the support bar 14. The retainer 12 is secured to the support bars 14 and 16 at one end as by brazing or welding and the other retainer 13 is secured to the rods 18 of the support bars 14 and 16 in like manner. In one preferred embodiment of the present invention the retainers 12 and 13 have a channel width of the order of ¾ of an inch so as to readily receive an X-ray cassette disposed between the retainers which are drawn snugly against the vertical ends of the cassette to thus retain the cassette in the holder.

A pivot plate 21 is secured to the lower support or slide bars 16 in horizontal extension rearwardly therefrom with a vertical cylinder 22 fixedly mounted on the plate in extension upwardly therefrom. A short rod 23 is secured between the upper support or slide bar 14 and the vertical cylinder 22.

A pivot link 26 extends from the underside of the pivot plate 21 horizontally into pivotal engagement with a mounting plate 27. The pivot plate 21 and link 26 are pivotally connected to each other by an elongated bolt 28 extending through the cylinder 22 with a head 29 disposed beneath and fixed with respect to the link 26. A washer 30 is welded to the top of the cylinder 22 with an opening fitting the bolt 28 extending therethrough. An enlarged head or handle 31 is threaded on the upper end of the bolt 28 so that the handle may be turned to bear on the washer 30 and tighten the link 26 and plate 21 together in any desired pivotal relationship.

The pivot link 26 lies flat upon the mounting plate 27 and is pivotally connected thereto by a pivot pin 36 extending vertically through the link and plate with an enlarged lower end welded to the plate 27. A knob or handle 38 is threaded on the upper end of the pivot pin 36 so that manually turning this knob 38 will tighten the link and plate together. In view of the fact that the link 26 may have a substantial length, provision is also made for firmly locking the pivotal relationship of link 26 and mounting plate 27 and this may be accomplished by the provision of a small projection or bump 41 on the underside of the link 26 adapted to mate with and fit into one of a plurality of small depressions 42 disposed in an arc of a circle about the pivot pin 36 in the upper surface of the mounting plate 27. Tightening of the link 26 against the mounting plate 27 with the projection 41 in one of the indentations 42 will thus positively lock the link in desired pivotal relationship to the mounting plate.

The cassette holder of the present invention is adapted to be mounted at one side of an X-ray table in a track extending along the top side of the table. Such a track 51 is shown in phantom in FIG. 2 of the drawings and will be seen to define a re-entrance slot. An elongated rectangular foot or bar 52 is provided on the present invention to slidably fit the slot in the track 51. This foot 52 is mounted on the bottom of a pair of hollow, internally threaded legs 53 and 54 depending from the mounting plate 27 and attached thereto as by means of countersunk bolts 56 threaded through the legs. The foot 52 is preferably attached to the bottom of the legs 53 and 54 by the lower ends of the bolts 56 threaded into the foot.

The foot 52 is adapted to be slid along the track 51 and locking means are provided for securing the foot in desired adjusted position along the track. The foot 52 extends to one side of the mounting plate 27 and a locking bolt 58 is threaded through the foot thereat with a handle or knob 59 affixed to the top of the bolt so that it may be threaded through the foot to force the foot against the inner upper portions of the track 51 and prevent longitudinal movement of the foot in the track.

Figure 5:
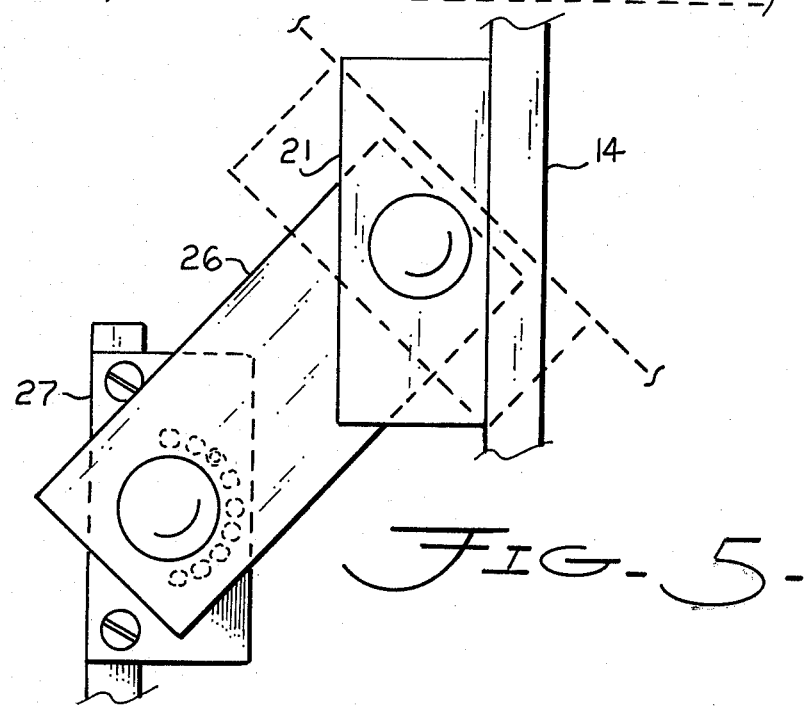
FIG. 5 is a top plan view of the holder of FIG. 1 in pivoted position and illustrating another pivoted position in phantom.

The cassette holder of the present invention is readily employed by a technician, doctor or the like to hold X-ray film for cross table radiography. The foot 52 of the present invention is merely inserted in the track 51 along one side of an X-ray table and the holder is slid along the table to the desired position. The handle or knob 59 is then turned to lock the foot in the track at the desired position. The slide bars or support bars 14 and 16 are then adjusted in length so that the retainers 12 and 13 are disposed a desired distance apart to receive the particular cassette to be employed. Different size X-ray film plates or cassettes are employed for different purposes and the present invention is adapted to hold cassettes or plates of varying sizes. The cassette is then slid into the holder between the end retainers 12 and 13 so that the cassette or plate comes to rest upon the top of the table. The film may then be oriented as desired for different procedures and pictures by loosening the handles 31 and 32 so that the retainers 12 and 13 may be pivoted about into desired position. Alternate positions are generally illustrated in FIG. 5 wherein the pivot link 26 is shown to be pivoted to an angle of about 45° from the position shown in FIG. 1. The pivot plate 21 and link 26 are also shown to be pivoted in the opposite direction about 45° from the position shown in FIG. 1 so that the slide or support bars 14 and 16, and thus the film, is aligned with the track and the foot of the holder, and thus spaced closer to the track. Alternatively, the pivot plate 21 and link 26 may, for example, be maintained in the position of FIG. 1 so as to dispose the support bars and thus the film in the position shown in phantom in FIG. 5.

One of the advantageous capabilities of the present invention is that of retaining X-ray film, plate or cassette thereof in desired relationship to a patient or the like upon a table that is adapted to be tilted up to 90° in either direction so as to place the patient's head upward or downward. Such tilting of an X-ray table is well known and is employed for different X-ray shots. It will be seen that the end retainers 12 and 13 of the present invention firmly engage the X-ray film in a cassette or plate to prevent possible movement thereof relative to the table after the holder of the present invention has been locked in position. This is highly advantageous, for prior art holders have not normally been adapted to retain film under these conditions.

It is furthermore noted that the additional positive locking means between the pivot link 26 and mounting plate 27 of the present invention provides a further degree of surety and safety against inadvertant displacement of the film by possible bumping of the holder during use or adjustment of table or patient. While such additional locking means could also be provided between the pivot plate 21 and pivot link 26 it is not necessary to do so inasmuch as the retaining means are only slightly displaced from the pivot link so that only a short lever arm exists and threaded locking is adequate.

The present invention has been described above with respect to a single preferred embodiment thereof; however, it will be appreciated by those skilled in the art that various modifications and variations are possible within the scope of the present invention and thus it is not intended to limit the invention to the precise details of illustration or terms of description.

What is claimed is:

1. An adjustable cross table X-ray film holder comprising
   movable end clamping means for engaging the ends of X-ray film in a cassette or the like
   a pivot plate carrying said clamping means and pivotally engaging a link extending rearwardly of said clamping means,
   a mounting plate having a depending foot adapted to slidably engage a track along a side of an X-ray table for supporting the holder, and
   a pivot pin connecting said link and mounting plate with means for fixing the angular relationship of link and mounting plate.

2. The holder of claim 1 further defined by said clamping means comprising
   a pair of channels disposed in vertical adjustably placed facing relation,
   a pair of horizontal parallel support bars having adjustable lengths between ends of each with said channels being mounted on opposite ends of said support bars for adjustable separation, and
   means for locking the adjusted length of at least one of said support bars.

3. The holder of claim 1 further defined by
   said pivot plate being disposed horizontally in extension perpendicularly from said clamping means and said link extending horizontally from said pivot plate,
   a vertical shaft extending through said pivot plate and link for pivotally connecting same, and
   means on said shaft for forcing said link and mounting plate together to prevent pivoting from any adjustable pivoted position.

4. The holder of claim 3 further defined by
   a cylinder fixed to said pivot plate and extending upwardly therefrom with a longitudinal bore through which said shaft extends,
   said shaft having an enlarged head fixed to the underside of said link beneath said pivot plate, and
   a handle threaded on the top of said shaft atop said cylinder for turning to lock and unlock the pivotal relationship of link and pivot plate.

5. The holder of claim 1 further defined by
   said link having a planar under surface lying upon the upper planar surface of said mounting plate,
   said link having a small projection on said planar surface at a predetermined distance from an axis of said pivot pin, and
   said mounting plate having a plurality of small indentations in said upper planar surface adapted to individually receive said link projection in mating relation and disposed on an arc of a circle about the axis of said pivot pin at a radius equal to said predetermined distance,
   whereby tightening of said link and mounting plate together with said projection in a predetermined indentation fixes the angular relationship of link and mounting plate.

6. The holder of claim 1 further defined by
   a pair of legs depending from said mounting plate and adjustably engaging said foot in spaced relation along the length thereof, and
   means threaded through said foot for tightening the foot in the track of an X-ray table to lock the foot in position longitudinally thereof.

* * * * *